(12) United States Patent
Helgren et al.

(10) Patent No.: US 10,656,514 B1
(45) Date of Patent: May 19, 2020

(54) DEVICES AND METHODS FOR FACILITATING DOME SCREEN IMAGE PROJECTION

(71) Applicant: LADUMA, INC., Salt Lake City, UT (US)

(72) Inventors: Jonas Helgren, Cottonwood Heights, UT (US); Collin Zito, Sandy, UT (US)

(73) Assignee: LADUMA, INC., Salt Lake City, UT (US)

( * ) Notice: Subject to any disclaimer, the term of this patent is extended or adjusted under 35 U.S.C. 154(b) by 22 days.

(21) Appl. No.: 16/189,798

(22) Filed: Nov. 13, 2018

(51) Int. Cl.
*G03B 37/04* (2006.01)
*H04N 9/31* (2006.01)
*G03B 21/56* (2006.01)

(52) U.S. Cl.
CPC ............. *G03B 37/04* (2013.01); *G03B 21/56* (2013.01); *H04N 9/3147* (2013.01)

(58) Field of Classification Search
CPC ...... H04N 9/3147; G03B 37/04; G03B 21/14; G03B 21/26; G03B 21/003
USPC .......................................... 359/451
See application file for complete search history.

(56) References Cited

U.S. PATENT DOCUMENTS

| 6,709,116 | B1 | 3/2004 | Raskar et al. |
| 2010/0220296 | A1 | 9/2010 | DePoar |
| 2010/0300006 | A1* | 12/2010 | Magpuri ............ E04H 3/22 52/8 |
| 2012/0105574 | A1 | 5/2012 | Baker et al. |
| 2012/0287407 | A1* | 11/2012 | De Paor ............ G03B 21/56 353/30 |

OTHER PUBLICATIONS

International Search Report for International Application No. PCT/US19/61186, dated Jan. 17, 2020, 2 pages.
International Written Opinion for International Application No. PCT/US19/61186, dated Jan. 17, 2020, 8 pages.

* cited by examiner

*Primary Examiner* — Ryan D Howard
(74) *Attorney, Agent, or Firm* — Loza & Loza, LLP; Tyler J. Barrett

(57) ABSTRACT

Fulldome image projection systems are adapted to facilitate projection of images onto a dome screen to create an immersive virtual environment. According to one example, an image projection system may include a fulldome screen formed at least substantially as a spherical cap. A plurality of sidewall projectors may be positioned within the screen and spaced from each other in a generally circular shape. The plurality of sidewall projectors may be oriented in an angular projection configuration. At least one zenith projector may be oriented to project images toward at least a portion of a zenith of the fulldome screen. Other aspects, embodiments, and features are also included.

18 Claims, 6 Drawing Sheets

DEVICES AND METHODS FOR FACILITATING DOME SCREEN IMAGE PROJECTION

TECHNICAL FIELD

The technology discussed below relates generally to image display systems, and more specifically to methods and devices for facilitating dome screen image projection.

BACKGROUND

Domed imaging systems, which may also be referred to as "fulldome" are generally known and used for both entertainment and training. Fulldome refers to immersive dome-based image projection environments in which video images and/or still images are projected onto a spherical surface to facilitate immersive viewing by a person within the sphere or dome. The dome is filled with real-time (interactive) or pre-rendered (linear) computer animations, live capture images, and/or composited environments. Fulldome environments have evolved from numerous influences, including immersive art and storytelling, with technological roots in domed architecture, planetariums, multi-projector film environments, flight simulation, and virtual reality. Improvements to such fulldome technologies may be beneficial to improve the viewer experience.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate fulldome image projection that improves the viewer experience when the viewer is inside the fulldome system. According to at least one example, an image projection system of the present disclosure may include an enclosure forming a dome-shaped interior surface. A plurality of sidewall projectors may be positioned within the enclosure and spaced from each other in a generally circular shape. The plurality of sidewall projectors can be positioned in an angular projection configuration with each sidewall projector oriented to project a center point of a respective image onto the interior surface at an angle between 45° and 180° relative to a respective radius of the generally circular shape formed by the plurality of sidewall projectors. At least one zenith projector may be oriented to project images toward at least a portion of a top area of the dome-shaped interior surface.

Further aspects of the present disclosure are directed to fulldome projection systems. According to at least one example, such fulldome projection systems may include a screen formed at least substantially as a spherical cap. A plurality of sidewall projectors may be spaced from each other in a generally circular shape within the spherical cap-shaped screen. The plurality of sidewall projectors may be positioned to project images onto a surface of the screen in an angular projection configuration, where each sidewall projector projects a respective image including a right-side edge and a left-side edge, and where the right-side edge of the respective image projected by each sidewall projector overlaps with a left-side edge of a respective image projected by a first adjacent sidewall projector, and the left-side edge of the respective image projected by each sidewall projector overlaps with a right-side edge of a respective image projected by a second adjacent sidewall projector. At least one zenith projector may be positioned to project an image onto at least a portion of an area about a zenith of the surface of the screen, where the image projected by the at least one zenith projector includes at least one edge overlapping with a portion of an image projected by at least one sidewall projector of the plurality of sidewall projectors.

Yet additional aspects of the present disclosure include methods of projecting images onto a spherical screen. According to at least one example, such methods may include positioning a plurality of sidewall projectors spaced from each other in a generally circular shape within a screen formed at least substantially as a spherical cap. A respective image may be projected from each of the sidewall projectors onto the screen, with a center point of each respective image projected by each sidewall projector at an angle between 45° and 180° relative to a radius of the generally circular shape formed by the plurality of sidewall projectors. At least one zenith projector may be positioned within the screen, and a respective image from the at least one zenith projector may be projected onto an area around a zenith of the screen.

Other aspects, features, and embodiments associated with the present disclosure will become apparent to those of ordinary skill in the art upon reviewing the following description in conjunction with the accompanying figures.

DRAWINGS

DETAILED DESCRIPTION

The illustrations presented herein are, in some instances, not actual views of any particular image display system, dome, or image projection system, but are merely idealized representations which are employed to describe the present disclosure. Additionally, elements common between figures may retain the same numerical designation.

Figure 1:
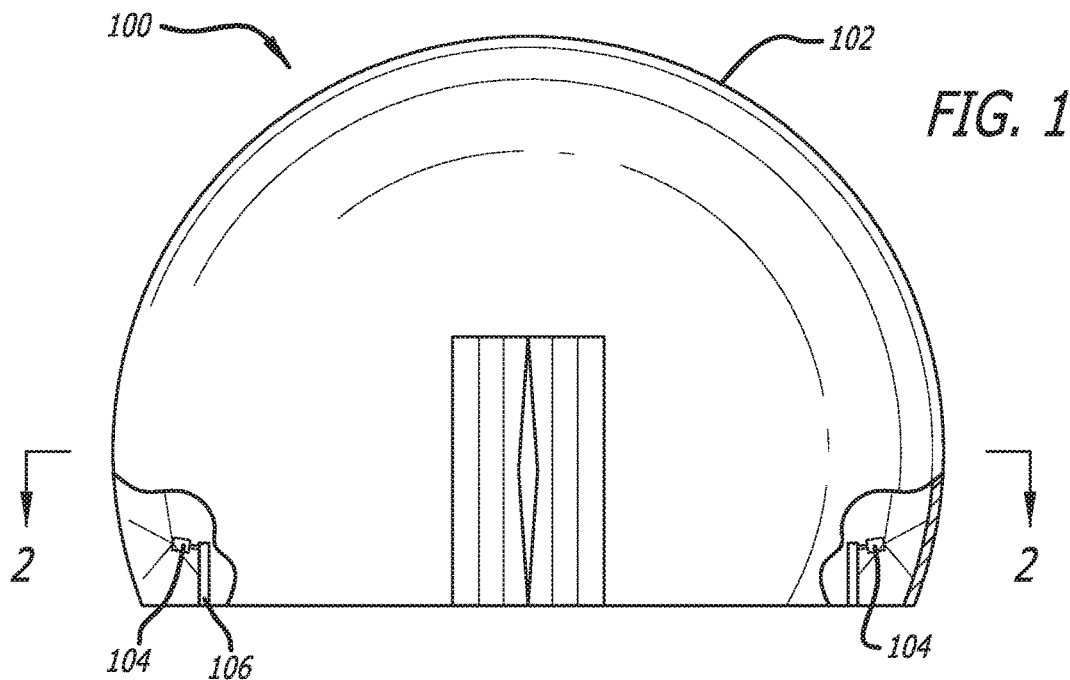
FIG. 1 is a schematic diagram of a fulldome image display system according to at least one example of the present disclosure.

Various embodiments of the present disclosure include fulldome 360° image display systems. Referring to FIG. 1, a fulldome image display system 100 includes a dome 102 configured to display images projected by a plurality of sidewall projectors 104, and one or more zenith projectors (see, e.g., FIG. 4). The dome 102 generally includes a frame, such as an inflated or truss-like frame structure with a spherical shape, and a screen coupled to the frame. That is, the dome 102 may be at least substantially configured in the shape of a spherical cap. The screen forms an inner surface of the dome 102 and accordingly has at least substantially the same shape as the dome 102. The screen may be any suitable material for displaying images projected onto the screen by a projector. Examples of suitable domes 102 include the various domes (e.g., 5M Dome, 6M Dome, 7M Dome, 8M Dome, 10M Dome, 12M Dome, 14M Dome, 15M Dome, 20M Dome, 27M Dome, 35M Dome, etc.) sold by FULLDOME.PRO in Torrance, Calif., found on the internet at the time of filing the present patent application at https://fulldome.pro/domes/.

The plurality of sidewall projectors 104 may be positioned within the dome 102. In at least some examples, the plurality of sidewall projectors 104 may be located at a generally lower level of the dome 102. In some such examples, the sidewall projectors 104 may be positioned adjacent to the floor 106 of the dome 102 on which users inside the dome may stand. For instance, the sidewall projectors 104 may be positioned in an area between about 30 inches below the floor 106 of the dome 102 up to about 30 inches above the floor 106 of the dome 102. In some embodiments, the sidewall projectors 104 may be positioned in a range between about 12 inches below the floor 106 to about 12 inches above the floor 106.

Figure 2:
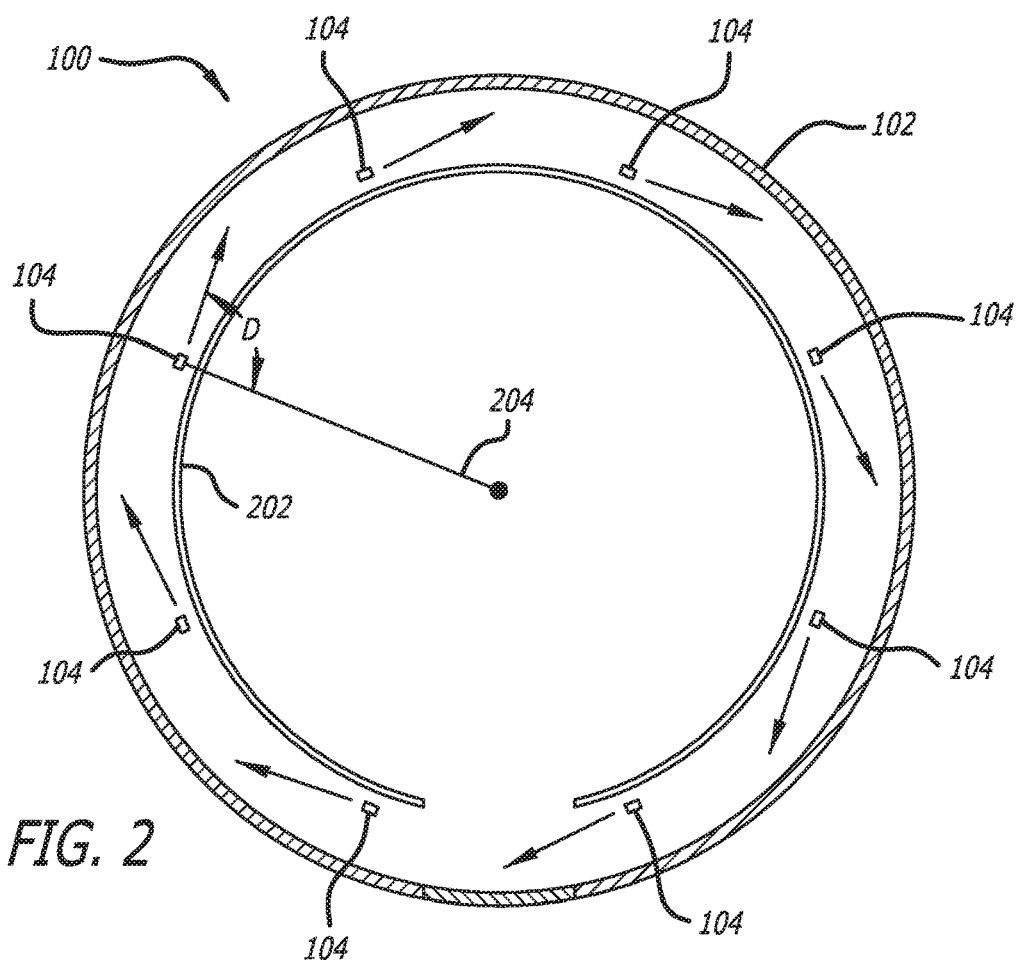
FIG. 2 is a schematic diagram illustrating a cross-sectioned plan view of the fulldome image display system across section 2-2 in FIG. 1.

Turning to FIG. 2, a cutaway view of the fulldome image display system 100 is depicted across section 2-2 in FIG. 1. As shown, the sidewall projectors 104 can be spaced from each other in a generally circular shape within the dome 102. According to an aspect of the disclosure, the plurality of sidewall projectors 104 are positioned to project images onto the screen in an angular projection configuration. As used herein, an angular projection configuration refers to each respective sidewall projector 104 being oriented to project in a direction generally angular relative to the generally circular shape formed by the location of all of the sidewall projectors 104. For example, in FIG. 2 each sidewall projector 104 is connected to a generally circular support 202, such that the support 202 generally forms the circle associated with each of the sidewall projectors 104. Each sidewall projector 104 is then oriented to project in the general direction of the respective arrow, where each arrow represents the projection of a point at about the center point of the respective image projected by each sidewall projector 104. As depicted, the center point of the image projected by each sidewall projector 104 is projected at an angle 'D' relative to the radius 204 of the circle formed by the sidewall projectors 104. In an angular projection configuration, the sidewall projectors 104 are oriented so the angle 'D' is less than 180° and greater than 45°. In some embodiments, the angle 'D' is between about 45° and 135°. In some embodiments, the center point of each respective image projected by each sidewall projector 104 may be at least substantially tangential to the circle formed by the sidewall projectors 104.

In some embodiments, all of the sidewall projectors 104 may be positioned to project onto a respective location of the screen that is located counterclockwise from a location of each sidewall projector 104. For example, FIG. 2 shows the plurality of sidewall projectors 104 each oriented to project in a generally counterclockwise direction, as shown by the arrows depicting a general direction of an approximate center point of the image projected by each sidewall projector 104. In other embodiments, the sidewall projectors 104 can be positioned to project onto a respective location of the screen that is located counterclockwise from a location of each sidewall projector 104, opposite to the example shown in FIG. 2. In either case, the angular projection configuration defined herein refers to all of the projectors oriented to project in the same generally clockwise or generally counterclockwise direction.

Figure 3:
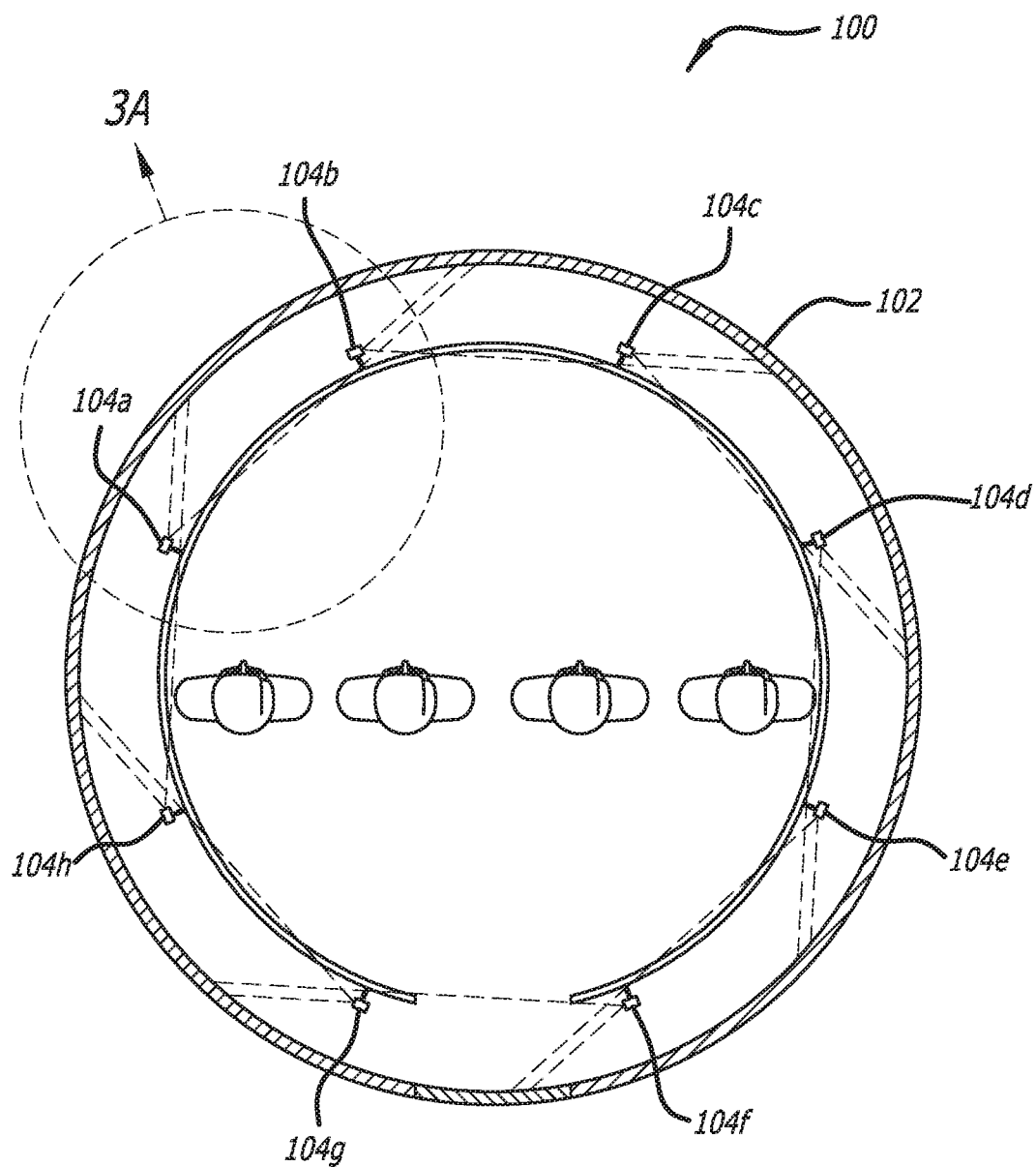
FIG. 3 is another schematic diagram illustrating the cross-sectioned plan view of the fulldome image display system across section 2-2 in FIG. 1.

Although FIG. 2 shows arrows to depict the general direction of image projection for an approximate center point of each respective image, each sidewall projector 104 in reality projects images over an area and not just to a single point. FIG. 3 is a top view similar to FIG. 2, but showing an example of the image projections covering an area according to at least one embodiment. As shown, each sidewall projector 104 are depicted respectively with indicators 'a', 'b', 'c', etc. Further, the right and left side edges of an example projected image is shown for each sidewall projector 104 by the broken lines. As depicted, a right-side edge of the respective image projected by each sidewall projector overlaps with a left-side edge of a respective image projected by a first adjacent sidewall projector. Further, the left-side edge of the respective image projected by each sidewall projector overlaps with a right-side edge of a respective image projected by a second adjacent sidewall projector.

Figure 3A:
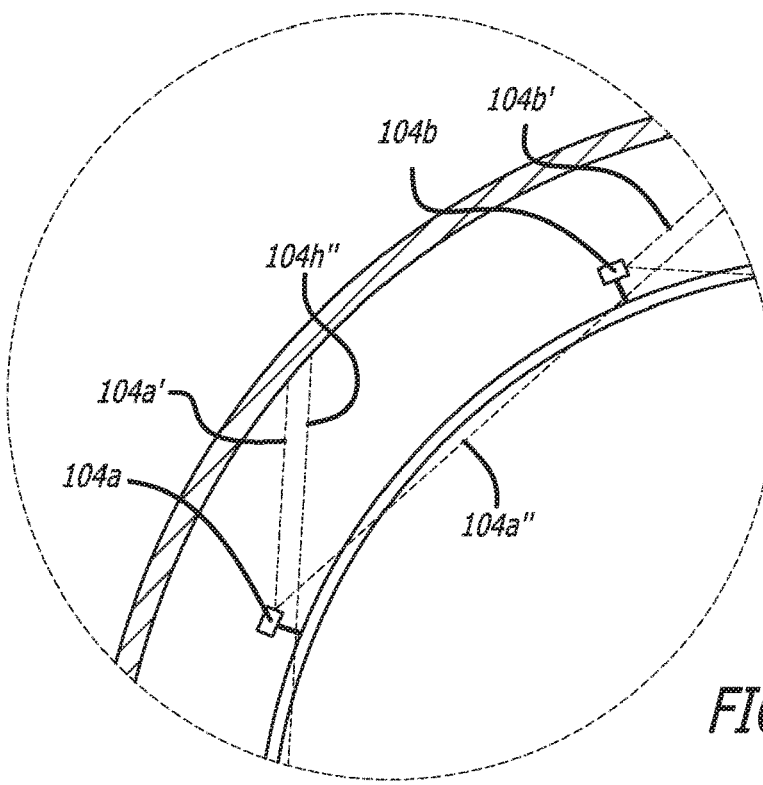
FIG. 3A is a magnified view of the section 3A in FIG. 3.

For example, referring to FIG. 3A depicting a magnified view from section 3A in FIG. 3, the broken line labeled 104a' represents the left-side edge of an image projected by sidewall projector 104a, and the broken line labeled 104a" represents the right-side edge of the same image projected by sidewall projector 104a. As shown, the left-side edge 104a' of the image projected by sidewall projector 104a overlaps with a portion of the right-side edge 104h" of the image projected by the first adjacent sidewall projector 104h. Further, the right-side edge 104a" of the image projected by sidewall projector 104a overlaps with a portion of the left-side edge 104b' of the image projected by the second adjacent sidewall projector 104b. Similar overlapping occurs around the entire dome as depicted in FIG. 3. In this manner, the entire inside surface of the dome 102 formed by the screen is filled with images on the sidewalls from the sidewall projectors 104.

Figure 4:
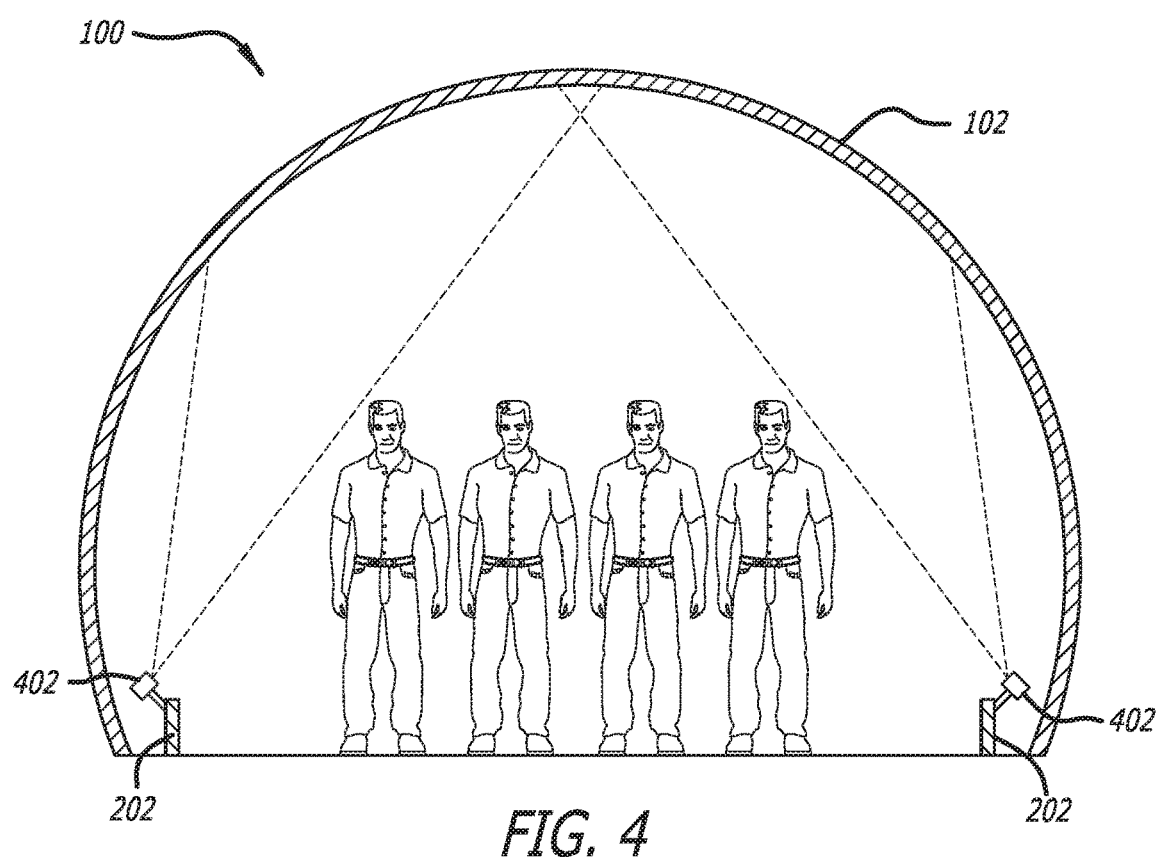
FIG. 4 is a cross-sectioned elevation view of the image display system 100 according to at least one example of the present disclosure.

In addition to the sidewall projectors 104, the image display system 100 includes one or more zenith projectors. FIG. 4 is a cross-sectioned elevation view of the image display system 100 according to at least one embodiment. As shown, the image display system 100 can include one or more zenith projectors 402, which may be positioned at a similar lower level of the dome 102 as the sidewall projectors 104. In the example depicted, each zenith projector 402 is coupled to the same support 202 to which the sidewall projectors 104 are coupled. The zenith projectors 402, however, are oriented to project upward onto an area at or near the zenith of the dome 102. As depicted, the two zenith projectors 402 project over respective areas that partially overlap each other. In other embodiments where just a single zenith projector 402 is utilized, the zenith projector 402 is oriented to project over the entire area at the top of the dome 102 where the sidewall projectors 104 do not project.

Figure 5:
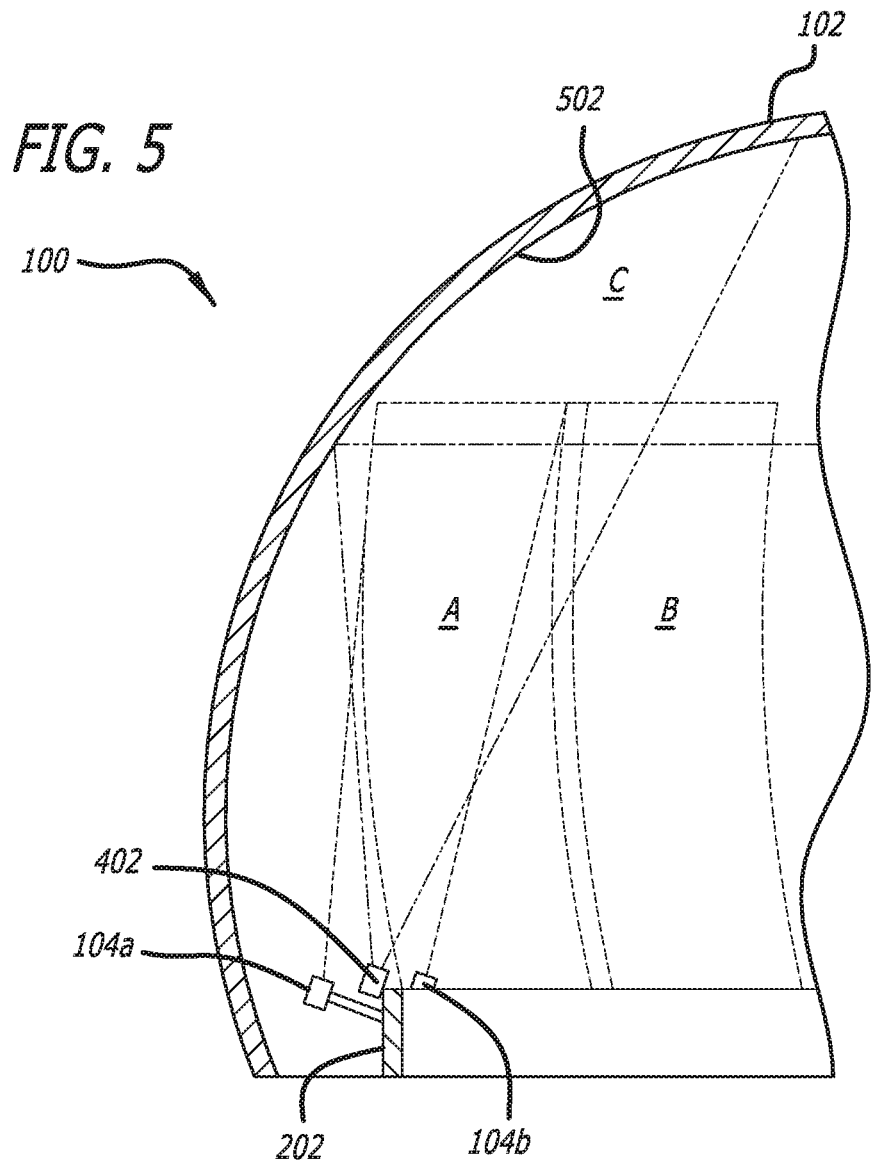
FIG. 5 is a partial sectioned view of an image display system according to at least one example of the present disclosure.

The overlapping of images between sidewall projectors 104 and the one or more zenith projectors 402 is further shown in FIG. 5, which is a partial sectioned view of the image display system 100 according to at least one example. As shown, a first sidewall projector 104a projects a first image onto a sidewall of the screen 502 inside the dome 102, as depicted by the area A defined by the first pattern of broken lines. A second sidewall projector 104b similarly projects a second image onto a sidewall of the screen 502, as depicted by the area B defined by the second patter of broken lines. As shown, the first image A and the second image B partially overlap with each other. A zenith projector 402 is also shown projecting onto the screen 502, as depicted by the area C located above the third pattern of broken lines. The zenith image C also partially overlaps with each of the first image A and the second image B. By overlapping the images projected by the various projectors as described, the entire interior of the dome 102 can be covered with projected images to create an immersive experience for people who may enter into the dome 102.

Figure 6:
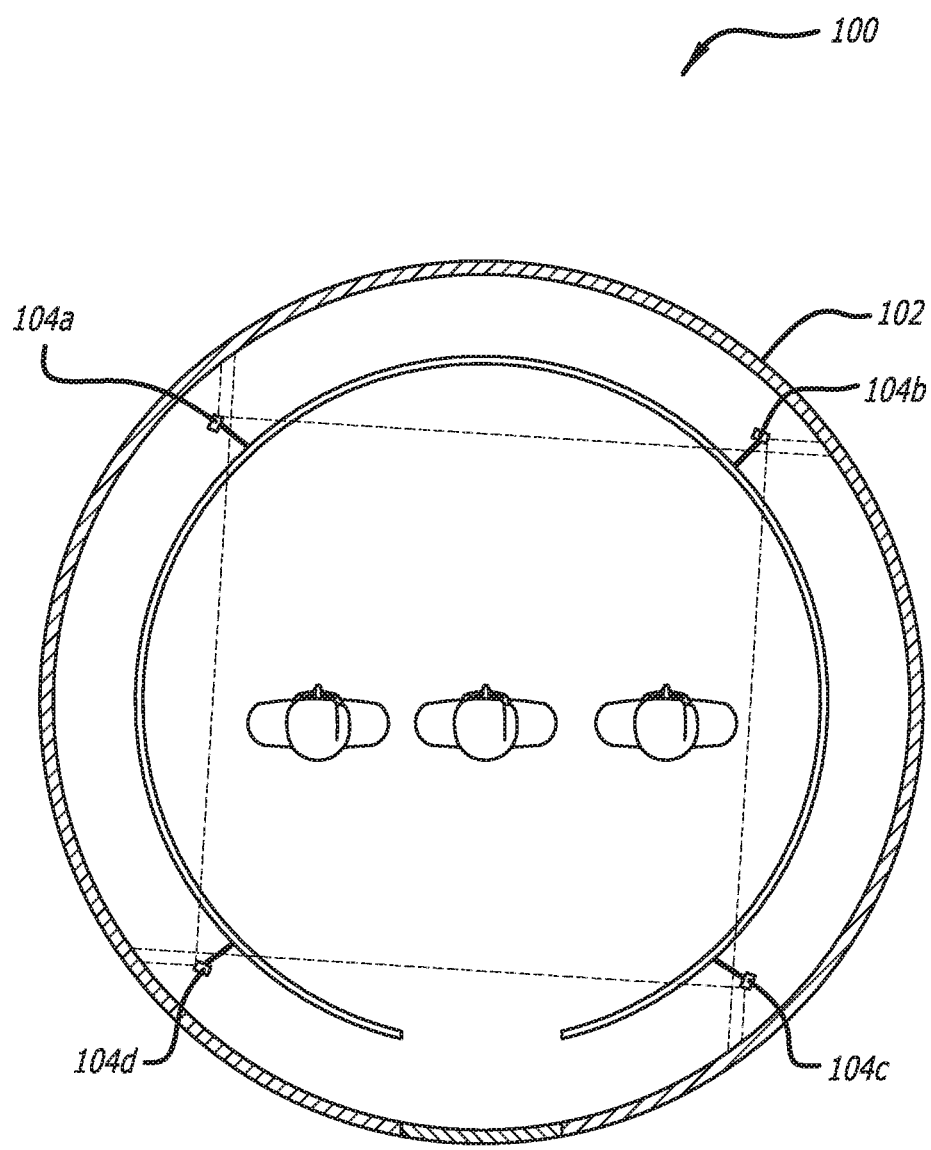
FIG. 6 is another schematic diagram illustrating the cross-sectioned plan view of the fulldome image display system across section 2-2 in FIG. 1.

Although the examples show specific numbers of sidewall projectors 104 and zenith projectors 402, it should be understood that the number of sidewall projectors 104 can vary, and one or more zenith projectors 402 may be utilized. The number may depend on the size of the dome 102 and the number of people it may be desirable to accommodate. As shown in FIG. 3, a space is created in which users may move around without casting shadows by partially blocking an image projected by a sidewall projector 104. With more projectors in a given space, the area in which users may move is expanded. Although too many projectors may cause problems with visibility of the images resulting from too much light inside the dome 102. By reducing the number of projectors within a dome 102, the area in which users may move without casting shadows will decrease, as shown in FIG. 6. As depicted in FIG. 6, only four sidewall projectors 104 are utilized. The broken lines depict the right and left sides of the images projected by each respective sidewall projector 104. As a result of the fewer sidewall projectors 104, fewer users are able to enter the dome 102 without casting shadows (i.e., without crossing a broken line depicting a side of an image projected by each sidewall projector 104. As a result, the area in which a user can move around inside the dome without casting shadows is reduced, compared to the example in FIG. 3.

Figure 7:
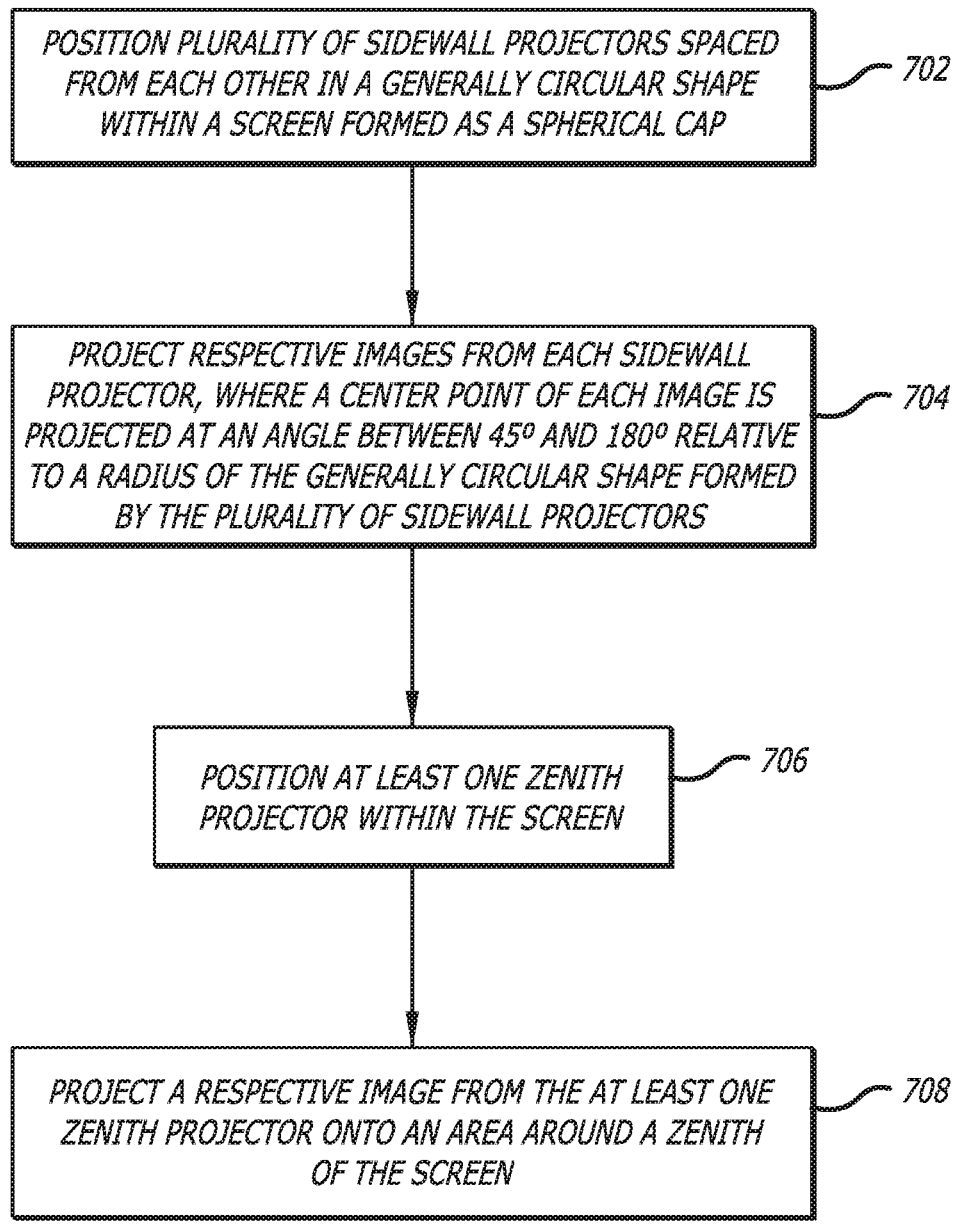
FIG. 7 is a flow diagram illustrating a method of projecting images onto a spherical screen according to at least one example.

Further aspects of the present disclosure include methods for projecting images onto a spherical screen. FIG. 7 is a flow diagram illustrating at least one example of such a method according to one or more implementations of the present disclosure. As depicted, a plurality of sidewall projectors may be positioned and spaced from each other in a generally circular shape within a screen formed at least substantially as a spherical cap at 702. For example, the sidewall projectors 104 may be positioned as described above with reference to FIGS. 2, 3, and 6 above.

At 704, a respective image from each of the sidewall projectors is projected onto the screen. As described herein above with reference to FIG. 2, a center point of each respective image projected by each sidewall projector 104 may be projected at an angle between about 45° and 180° relative to a radius of the generally circular shape formed by the plurality of sidewall projectors 104. Such projection may further include projecting the respective image from each of the sidewall projectors with a right-side edge of each respective image overlapping with a left-side edge of an image projected by a first adjacent sidewall projector, and a left-side edge of each respective image projected by each sidewall projector overlapping with a right-side edge of a respective image projected by a second adjacent sidewall projector, as described above with reference to FIGS. 3 and 3A. As also noted above, the projectors may project a respective image onto a respective location of the screen that is located either counterclockwise from each respective sidewall projector, or clockwise from each respective sidewall projector.

At 706, at least one zenith projector may be positioned within the screen. Further, at 708, a respective image may be projected from the at least one zenith projector onto an area around a zenith of the screen, as described herein with reference to FIGS. 4 and 5.

By employing one or more aspects of the present disclosure, a virtual reality environment can be created in which multiple users may enter and experience together as a group, without the users wearing a headset.

While the above discussed aspects, arrangements, and embodiments are discussed with specific details and particularity, one or more of the components, steps, features and/or functions illustrated in FIGS. 1, 2, 3, 4, 5, 6 and/or 7 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, 3, 4 and/or 6 may be configured to perform or employ one or more of the methods, features, parameters, and/or steps described in FIG. 7.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An image projection system, comprising:
   an enclosure forming a dome-shaped interior surface;
   a plurality of sidewall projectors within the enclosure and spaced from each other in a generally circular shape, wherein the plurality of sidewall projectors are positioned in an angular projection configuration with each sidewall projector oriented to project a center point of a respective image onto the interior surface at an angle between 45° and 180° relative to a respective radius of the generally circular shape formed by the plurality of sidewall projectors; and at least one zenith projector oriented to project images toward at least a portion of a top area of the dome-shaped interior surface.

2. The image projection system of claim 1, wherein the plurality of sidewall projectors and the at least one zenith projector are each positioned adjacent to a floor within the enclosure.

3. The image projection system of claim 1, wherein each sidewall projector of the plurality of sidewall projectors is further oriented to project a respective image to overlap with a portion of respective images projected by each of the two adjacent sidewall projectors within the enclosure.

4. The image projection system of claim 1, wherein the at least one zenith projector is further oriented to project a respective image to overlap with a portion of a respective image projected from at least one sidewall projector.

5. The image projection system of claim 1, comprising a plurality of zenith projectors, wherein each zenith projector is oriented to project a respective image to overlap with a respective image projected from at least one sidewall projector and with a respective image projected from at least one zenith projector of the plurality of zenith projectors.

6. A method of projecting images onto a spherical screen, comprising:

positioning a plurality of sidewall projectors spaced from each other in a generally circular shape within a screen formed at least substantially as a spherical cap;

projecting a respective image from each of the sidewall projectors onto the screen, wherein a center point of each respective image projected by each sidewall projector is projected at an angle between 45° and 180° relative to a radius of the generally circular shape formed by the plurality of sidewall projectors;

positioning at least one zenith projector within the screen; and projecting a respective image from the at least one zenith projector onto an area around a zenith of the screen.

7. The method of claim 6, wherein projecting the respective image from each of the sidewall projectors onto the screen further comprises:

projecting the respective image from each of the sidewall projectors with a right-side edge of each respective image overlapping with a left-side edge of an image projected by a first adjacent sidewall projector, and a left-side edge of each respective image projected by each sidewall projector overlapping with a right-side edge of a respective image projected by a second adjacent sidewall projector.

8. The method of claim 6, wherein projecting the respective image from the at least one zenith projector onto an area around a zenith of the screen comprises:

projecting the respective image from the at least one zenith projector to partially overlap with a respective image projected from at least one sidewall projector.

9. The method of claim 6, wherein projecting the respective image from each of the sidewall projectors onto the screen further comprises:

projecting the respective image from each of the sidewall projectors onto a respective location of the screen that is located counterclockwise from the respective sidewall projector.

10. The method of claim 6, wherein projecting the respective image from each of the sidewall projectors onto the screen further comprises:

projecting the respective image from each of the sidewall projectors onto a respective location of the screen that is located clockwise from the respective sidewall projector.

11. The method of claim 6, wherein positioning the plurality of sidewall projectors spaced from each other in a generally circular shape within the screen formed at least substantially as a spherical cap comprises:

positioning the plurality of sidewall projectors in an area between 30 inches below a floor within the substantially spherical cap-shaped screen and 30 inches above the floor.

12. A fulldome projection system, comprising:

a screen formed at least substantially as a spherical cap;

a plurality of sidewall projectors spaced from each other in a generally circular shape within the spherical cap-shaped screen, the plurality of sidewall projectors positioned to project images onto a surface of the screen in an angular projection configuration, wherein each sidewall projector projects a respective image including a right-side edge and a left-side edge, and wherein the right-side edge of the respective image projected by each sidewall projector overlaps with a left-side edge of a respective image projected by a first adjacent sidewall projector, and the left-side edge of the respective image projected by each sidewall projector overlaps with a right-side edge of a respective image projected by a second adjacent sidewall projector; and at least one zenith projector positioned to project an image onto at least a portion of an area about a zenith of the surface of the screen, wherein the image projected by the at least one zenith projector includes at least one edge overlapping with a portion of an image projected by at least one sidewall projector of the plurality of sidewall projectors.

13. The fulldome projection system of claim 12, wherein the plurality of sidewall projectors positioned to project onto a surface of the screen in an angular projection configuration comprises:

each respective sidewall projector of the plurality of sidewall projectors positioned to project onto a respective location of the surface of the screen that is located counterclockwise from each respective sidewall projector.

14. The fulldome projection system of claim 12, wherein the plurality of sidewall projectors positioned to project onto a surface of the screen in an angular projection configuration comprises:

each respective sidewall projector of the plurality of sidewall projectors positioned to project onto a respective location of the surface of the screen that is located clockwise from each respective sidewall projector.

15. The fulldome projection system of claim 12, wherein each sidewall projector of the plurality of sidewall projectors is further oriented to project a center point of a respective image at an angle between 45° and 180° relative to a respective radius of the generally circular shape formed by the plurality of sidewall projectors.

16. The fulldome projection system of claim 15, wherein each sidewall projector of the plurality of sidewall projectors is oriented to project a center point of a respective image at an angle between 45° and 135° relative to a respective radius of the generally circular shape formed by the plurality of sidewall projectors.

17. The fulldome projection system of claim 12, wherein the plurality of sidewall projectors and the at least one zenith projector are each positioned in an area between 30 inches below a floor within the substantially spherical cap-shaped screen and 30 inches above the floor.

18. The fulldome projection system of claim 12, wherein the at least one zenith projector comprises a plurality of zenith projectors each positioned to project a respective image onto at least a portion of an area about a zenith of the surface of the screen, wherein each respective image projected by each zenith projector includes at least one edge overlapping with a respective image projected by at least one sidewall projector and at least one edge overlapping with a respective image projected by at least one other zenith projector of the plurality of zenith projectors.

* * * * *